(12) United States Patent
Torkildsen

(10) Patent No.: US 8,459,027 B2
(45) Date of Patent: Jun. 11, 2013

(54) COMBUSTION ENGINE HAVING MUTUALLY CONNECTED PISTONS

(76) Inventor: Odd Bernhard Torkildsen, Oslo (NO)

( * ) Notice: Subject to any disclaimer, the term of this patent is extended or adjusted under 35 U.S.C. 154(b) by 431 days.

(21) Appl. No.: 12/746,606

(22) PCT Filed: Jan. 27, 2009

(86) PCT No.: PCT/NO2009/000030
§ 371 (c)(1),
(2), (4) Date: Jun. 7, 2010

(87) PCT Pub. No.: WO2009/113862
PCT Pub. Date: Sep. 17, 2009

(65) Prior Publication Data
US 2011/0094461 A1    Apr. 28, 2011

(30) Foreign Application Priority Data

Mar. 14, 2008   (NO) .................................. 20081383
Jan. 27, 2009   (WO) ................ PCT/NO2009/000030

(51) Int. Cl.
*F01K 23/10*   (2006.01)
*F02G 3/00*    (2006.01)
*F02B 75/24*   (2006.01)

(52) U.S. Cl.
USPC .............................. 60/618; 60/620; 123/53.3

(58) Field of Classification Search
USPC ............... 60/516–526, 616, 618, 620, 641.8, 60/641.15, 645–681; 123/53.3, 53.4
See application file for complete search history.

(56) References Cited

U.S. PATENT DOCUMENTS

| | | | | | |
|---|---|---|---|---|---|
| 1,893,045 | A | * | 1/1933 | Weidner | 123/53.3 |
| 2,196,979 | A | * | 4/1940 | Campbell | 60/618 |
| 4,708,099 | A | * | 11/1987 | Ekker | 123/53.4 |
| 4,739,620 | A | * | 4/1988 | Pierce | 60/641.8 |
| 2006/0130782 | A1 | | 6/2006 | Boland | |

FOREIGN PATENT DOCUMENTS

DE  2750549 A1  5/1979
FR  2295229 A1  7/1976

* cited by examiner

*Primary Examiner* — Kenneth Bomberg
*Assistant Examiner* — Christopher Jetton
(74) *Attorney, Agent, or Firm* — David A. Guerra

(57) ABSTRACT

Combustion engine comprising interconnected combustion cylinders (1, 2, 3, 4), comprising at least two sets of each two opposed working combustion cylinders (1, 2, 3, 4), said two cylinders of each set being interconnected by a common piston rod (5, 6), said two piston rods (5, 6) being connected by one balance arm (7), and the exploitable energy is taken from the kinetic energy of said balance arm (7).

13 Claims, 2 Drawing Sheets

COMBUSTION ENGINE HAVING MUTUALLY CONNECTED PISTONS

CROSS-REFERENCE TO RELATED APPLICATIONS

This application is an U.S. national phase application under 35 U.S.C. §371 based upon co-pending International Application No. PCT/NO2009/000030 filed on Jan. 27, 2009. Additionally, this U.S. national phase application claims the benefit of priority of co-pending International Application No. PCT/NO2009/000030 filed on Jan. 27, 2009 and Norway Application No. 20081383 filed on Mar. 14, 2008. The entire disclosures of the prior applications are incorporated herein by reference. The international application was published on Sep. 17, 2009 under Publication No. WO 2009/113862 A1.

BACKGROUND OF THE INVENTION

1. Field of the Invention

The present invention is related to a combustion engine having two sets of mutually connected piston. Said combustion engine can be combined with a steam engine comprising cylinders for combustion and steam.

2. Description of the Prior Art

The efficiency of the Otto motor is known to be relatively low in relation to the energy of the fuel to be combusted. Several attempts have been made to increase the efficiency. Still, however, combustion engines produce large heat losses to the atmosphere.

SUMMARY OF THE INVENTION

Engines of the above mentioned type are disclosed e.g. in GB 125 395, GB 125 174, GB 189373, GB 300631, U.S. Pat. No. 2,237,014 and DE 10 2004 013 854.

With the combustion engine according to the present invention a substantial efficiency increase is reached in relation to conventional combustion engines. The combustion engine may be a two-stroke or four-stroke engine with optional type of fuel. In a development a further efficiency increase is obtained by utilization of the large amounts of heat from the combustion process of the combustion engine for operation of a steam engine connected to the combustion engine.

BRIEF DESCRIPTION OF THE DRAWINGS

The invention will be better understood and objects other than those set forth above will become apparent when consideration is given to the following detailed description thereof. Such description makes reference to the annexed drawing wherein.

DETAILED DESCRIPTION OF THE INVENTION

Figure 1:
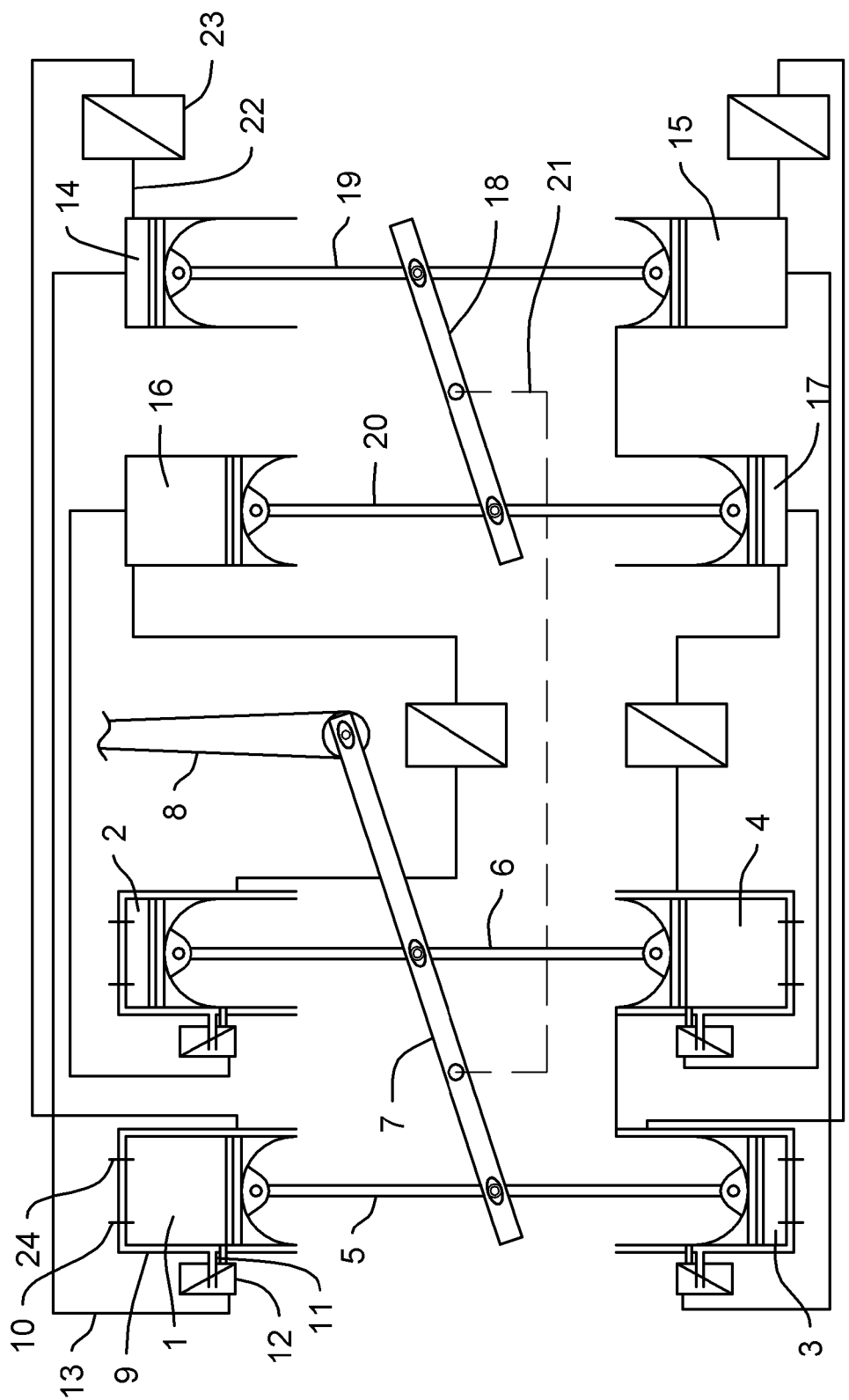
FIG. 1 is a block diagram of a combustion engine connected to a steam engine where four cylinders in a two-stroke combustion engine are connected with four cylinders in a steam engine.
Figure 2:
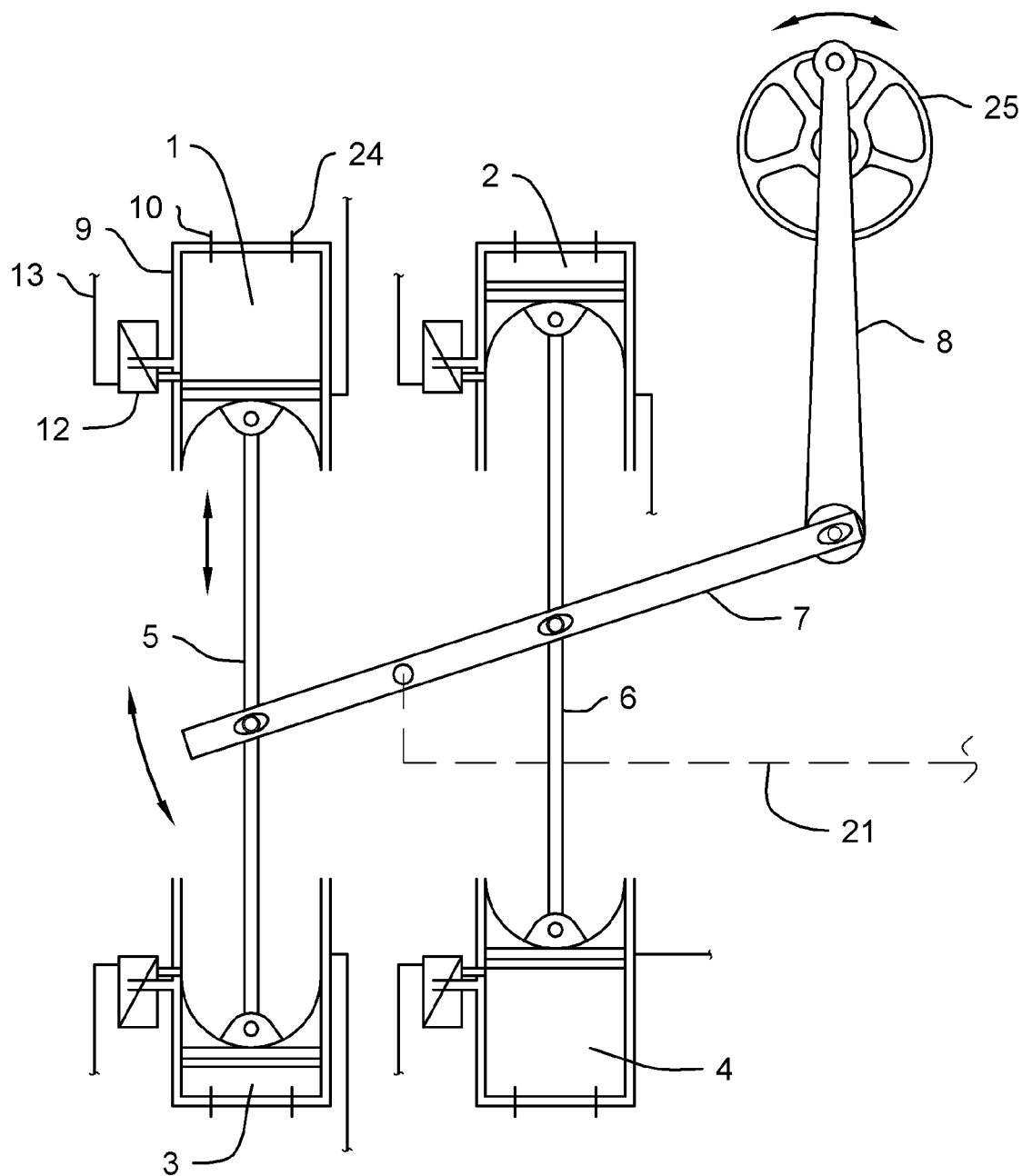
FIG. 2 is a diagram of the balance arm connected to a balance wheel.

The combustion engine comprises combustion cylinders 1, 2, 3 and 4 where opposed pistons of combustion cylinders 1 and 3 are connected with a common piston rod 5 and pistons of the opposed combustion cylinders 2 and 4 are connected with a common piston rod 6. The piston rods 5 and 6 are connected with a balance arm 7 which coordinate the movements of the piston rods. One end of the balance arm 7 is connected to a balance wheel 25. Each combustion cylinder 1, 2, 3 and 4 comprises a cooling jacket 9. Furthermore the combustion cylinders 1, 2, 3 and 4 each comprises a valve 10 for fuel, a valve 24 for air inlet to the combustion cylinders and a valve 11 for exhaust gas.

In a further development a steam engine may be connected to the combustion engine. Each cooling jacket 9 thereby being connected with a heat exchanger 12 where the heated cooling water is further heated by the exhaust gas from the exhaust gas valve 11 until the cooling water is in the state of super heated steam. Cooled exhaust gas thereafter is released to the atmosphere or to other possible use. The steam is transferred to a steam cylinder 14 in the steam engine through a pipe line 13.

The pistons of the steam cylinders 14 and 15 are connected with a common piston rod 19 and the pistons of the steam cylinders 16 and 17 are correspondingly connected with a common piston rod 20. Said piston rods 19 and 20 are connected with a balance arm 18. The rocking movements of the balance arms 7 and 18 are coordinated by a connection 21. Upon executed work in the steam cylinder 14 steam/condensate is returned to the cooling jacket 9 as cooled condensate.

In the drawing the combustion cylinder 1 is disclosed at the end of a working stroke. The heated cooling water in the cooling jacket 9 is conducted to the heat exchanger 12 through the pipe line 13 and further to the steam cylinder 14. The exhaust gas is flushed out of by air from the air inlet 24 and through a valve to the heat exchanger 12 for heating and vaporization of the cooling water. Thereafter fuel is guided through the valve 10 for compressing and combustion.

The steam from the heat exchanger 12, which is transferred through the pipe line 13, brings the steam cylinder 14 to perform a working stroke in the steam cylinder 14 by forcing the piston rod 19 downwardly in FIG. 1 whereby the piston rod 5 of the combustion cylinder 1 thereby is pressed upwardly. By the return stroke of the steam cylinder 14, steam from the steam cylinder 14 is forced through the pipe line 22 to the temperature regulator 23 whereby cooled cooling water is transferred from the temperature regulator 23 to the cooling jacket 9 around the combustion cylinder 1. With the arm 8 the movements of the mutually connected balance arms 7 and 18 may turn disclosed balance wheel 25 by rotation or the linear movement of the arm (8) may be used directly in a working machine.

The combustion cylinder with the piston connected with the piston rod 5 and the steam cylinder 15 work oppositely of the combustion cylinder 1 and the steam cylinder 14. Correspondingly the combustion cylinder 4 and the steam cylinder 17 work together with the combustion cylinder 1 and the steam cylinder 17 by the heat exchanger 12 and the temperature regulator 23. The combustion cylinder 2 and the steam cylinder 16 work oppositely of the combustion cylinder 1 and the steam cylinder 14.

Correspondingly the combustion cylinder 2 of the combustion engine is connected with the steam cylinder 16, the combustion cylinder 3 is connected with the steam cylinder 15 and the combustion cylinder 4 is connected with the steam cylinder 17. Hereby pipe lines correspond with the pipe lines 13, 22 and temperature regulators corresponding with the temperature regulator 23 being connecting the cylinders.

The geometry between the connection of the balance arms 7 to the piston rods 5 and 6 and connection of the balance 18 to the piston rods 19 and 20 in relation to the turning point of the connection 21 as well as the distance to the turning point of the balance wheel arm 8 of the balance arm 7 is optimized as regards to achieving as large moment of force as possible. At the same time the output of the steam engine in relation to the heat development of the combustion engine is optimized thereby to achieve optimal efficiency.

The invention claimed is:

1. A combustion engine comprising:
   interconnected combustion cylinders characterized in at least two sets of each two opposed working combustion cylinders said two cylinders of each set including pistons being interconnected by a common piston rod, said two piston rods being connected by one balance arm, and the exploitable energy is taken from the kinetic energy of said balance arm;
   a steam engine having at least two sets of each two opposed working steam cylinders including pistons being connected by a common steam engine piston rod, said steam engine piston rods being connected by a steam engine balance arm, said balance arm and said steam engine balance arm being connected by a connection; and
   a set of heat exchangers being thermally connected to said combustion cylinders and fluidly connected to the steam cylinders.

2. The combustion engine according to claim 1, wherein each combustion cylinder comprises one of said heat exchangers for vaporization of a cooling fluid from a cooling jacket on each combustion cylinder by exhaust gases, that heated steam from the cooling jacket of each combustion cylinder is transferred to said steam cylinders respectively through pipe systems and that the steam finishing a working stroke returns through an additional piping systems via a temperature regulator to the cooling jackets for cooling the combustion cylinders.

3. The combustion engine according to claim 1, wherein said balance arm defines a hole for connecting to each of said piston rods respectively, each of said holes having an oval configuration to receive a part of said piston rod respectively.

4. The combustion engine according to claim 3, wherein said oval holes each being configured to allow movement of said piston rods respectively while ends of said balance arm travel in a substantial arc.

5. The combustion engine according to claim 1, wherein said steam engine balance arm defines a hole for connecting to each of said steam engine piston rods respectively, each of said holes having an oval configuration to receive a part of said steam engine piston rod respectively.

6. The combustion engine according to claim 5, wherein said oval holes each being configured to allow movement of said steam engine piston rods respectively while ends of said steam engine balance arm travel in a substantial arc.

7. The combustion engine according to claim 1 further comprising at least one balance wheel, wherein said balance arm being connected to said balance wheel.

8. A combustion engine comprising:
   interconnected combustion cylinders, characterized in at least two sets of each two opposed working combustion cylinders, said two cylinders of each set including, pistons being interconnected by a common piston rod, said two piston rods being connected by one balance arm, and the exploitable energy is taken from the kinetic energy of said balance arm;
   a steam engine having at least two sets of each two opposed working steam cylinders including pistons being connected by a common steam engine piston rod, said steam engine piston rods being connected by a steam engine balance arm, said balance arm and said steam engine balance arm being connected by a connection;
   a set of heat exchangers being thermally connected to said combustion cylinders and fluidly connected to the steam cylinders; and
   wherein said balance arm defines a hole for connecting to each of said piston rods respectively, each of said holes having an oval configuration to receive a part of said piston rod respectively, said oval holes each being configured to allow movement of said piston rods respectively while ends of said balance arm travel in a substantial arc.

9. The combustion engine according to claim 8, wherein each of said combustion cylinders comprises one of said heat exchangers for vaporization of a cooling fluid from a cooling jacket on each said combustion cylinder by exhaust gases.

10. The combustion engine according to claim 9, wherein heated steam from said cooling jacket of each said combustion cylinder is transferred to said steam cylinders respectively through at least one pipe system, and that said heated steam finishing a working stroke returns through at least one additional piping system via a temperature regulator to said cooling jackets for cooling said combustion cylinders.

11. The combustion engine according to claim 9, wherein said steam engine balance arm defines a hole for connecting to each of said steam engine piston rods respectively, each of said steam engine balance arm holes having an oval configuration to receive a part of said steam engine rod respectively.

12. The combustion engine according to claim 11, wherein said steam engine balance arm oval holes each being configured to allow movement of said steam engine piston rods respectively while ends of said steam engine balance arm travel in a substantial arc.

13. The combustion engine according to claim 8 further comprising at least one balance wheel, wherein said balance arm being connected to said balance wheel.

* * * * *